US009378001B2

(12) United States Patent
Rahbar et al.

(10) Patent No.: US 9,378,001 B2
(45) Date of Patent: Jun. 28, 2016

(54) MATCHING PROGRAM SECTIONS THROUGH FEATURE EXTRACTION

(71) Applicant: Microsoft Corporation, Redmond, WA (US)

(72) Inventors: Ali Rahbar, Bellevue, WA (US); Elias Bachaalany, Bellevue, WA (US); Ali Pezeshk, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 14/268,248

(22) Filed: May 2, 2014

(65) Prior Publication Data

US 2015/0317138 A1    Nov. 5, 2015

(51) Int. Cl.
G06F 9/45    (2006.01)

(52) U.S. Cl.
CPC .............. *G06F 8/443* (2013.01); *G06F 8/4436* (2013.01); *G06F 8/53* (2013.01)

(58) Field of Classification Search
None
See application file for complete search history.

(56) References Cited

U.S. PATENT DOCUMENTS

| | | | |
|---|---|---|---|
| 6,668,325 B1 | 12/2003 | Collberg et al. | |
| 7,360,207 B2 | 4/2008 | Fahs et al. | |
| 7,389,500 B2 | 6/2008 | Tan | |
| 8,166,466 B2 * | 4/2012 | Mohanan | G06F 11/3672 717/136 |
| 8,365,155 B2 | 1/2013 | Rioux | |
| 8,479,188 B2 | 7/2013 | Singh et al. | |
| 8,863,069 B1 * | 10/2014 | Venkataramani | G06F 17/5045 716/100 |
| 8,997,046 B1 * | 3/2015 | McFarlane | G06F 9/5033 707/695 |
| 2004/0225996 A1 * | 11/2004 | Venkatesan | G06F 8/68 717/100 |
| 2005/0060697 A1 * | 3/2005 | Bicsak | G06F 8/4436 717/156 |
| 2005/0183072 A1 * | 8/2005 | Horning | G06F 21/125 717/140 |
| 2008/0271147 A1 * | 10/2008 | Mohanan | G06F 21/552 726/24 |
| 2012/0030659 A1 * | 2/2012 | Porras | G06F 8/4443 717/151 |
| 2012/0042306 A1 | 2/2012 | Kawahito et al. | |
| 2012/0254827 A1 * | 10/2012 | Conrad | G06F 8/35 717/104 |
| 2013/0019227 A1 | 1/2013 | Chiu | |
| 2015/0095877 A1 * | 4/2015 | Lin | G06F 8/36 717/104 |
| 2015/0205586 A1 * | 7/2015 | Diamos | G06F 9/30181 717/158 |

OTHER PUBLICATIONS

Sun et al., "Efficient Subgraph Matching on Billion Node Graphs," Copyright 2012 VLDB Endowment.*
Dullien et al. "Graph-based comparison of Executable Objects," 2005.*
"International Search Report & Written Opinion Received for PCT Patent Application No. PCT/US2015/028106", Mailed Date: Jun. 25, 2015, 15 Pages.

(Continued)

*Primary Examiner* — Insun Kang
(74) *Attorney, Agent, or Firm* — Aneesh Mehta; Kate Drakos; Micky Minhas

(57) ABSTRACT

A method includes organizing a program into blocks based on control flow. The method also includes calculating a plurality of features for each block. The method further includes comparing the calculated features for each block with other blocks and creating a list of equivalent blocks. The method also further includes constructing a list of equivalent program sections utilizing the list of equivalent blocks.

18 Claims, 6 Drawing Sheets

(56) References Cited

OTHER PUBLICATIONS

Debray, et al., "Compiler Techniques for Code Compaction", In ACM Transactions on Programming Languages and Systems, vol. 22, Issue 2, Mar. 1, 2000, pp. 378-415.

De Sutter, et al., "Sifting Out the Mud: Low Level C++ Code Reuse", In Proceedings of the 17th ACM SIGPLAN Conference on Object-Oriented Programming, Systems, Languages, and Applications, Nov. 1, 2002, pp. 275-291.

De Sutter, et al., "Link-time Binary Rewriting Techniques for Program Compaction", In Journals of ACM Transactions on Programming Languages and Systems, vol. 27, Issue 5, Sep. 1, 2005, pp. 882-945.

Lin, Yingyun T., "A Customizable SVG Graph Visualization Engine", In Proceedings of 5th Annual Conference on Scalable Vector Graphics, Sep. 7, 2007, 8 Pages.

Flake, Halvar, "Structural Comparison of Executable Objects," pp. 161-173, 2004.

Justia Patent Database, "Patents by Inventor Thomas Dullien," retreived from http://patents.justia.com/inventor/thomas-dullien, pp. 1-3, Apr. 23, 2014.

Sabin, Todd, "BindView-Comparing binaries with graph isomorphisms," Symantec, May 6, 2006, pp. 1-11.

Terashima et al., "Static Call Graph Generator for C++ using Debugging Information", In IEEE 14th Asia-Pacific Software Engineering Conference, Dec. 4, 2007, pp. 127-134.

\* cited by examiner

200

400A

400B

MATCHING PROGRAM SECTIONS THROUGH FEATURE EXTRACTION

BACKGROUND

When reverse engineering software, an analyst may often only have binary code to work with. The binary code is made up of a multitude of zeroes and ones that can be directly executed by a processor but are difficult for a person to read and understand. In some cases, the binary code can be translated into a different form to make reading the software easier. The resulting code lacks the constants and programmer comments that may have existed in the original high-level programming language that was compiled into binary code.

An inlined function is a function upon which the compiler has performed inline expansion. Inline expansion takes the complete body of the function that has been inlined and inserts the body of the function into every place that a function is called rather than generating code to call the function. Therefore, inlined functions may produce binary code that is voluminous and difficult to analyze. Compilers are not obligated to respect inlining of functions in every instance. A programmer can nonetheless forcefully inline functions in order to thwart reverse engineering attempts.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

The claimed subject matter provides a method for matching program sections. The method includes organizing a program into blocks based on control flow. The method can include transforming a program to an intermediate language representation and organizing the intermediate language representation into blocks based on control flow. The method also includes calculating a plurality of features for each block. The method further includes comparing the calculated features for each block with other blocks and creating a list of equivalent blocks. The method can include receiving a manual adjustment to the set of features that is to be used for equivalence checks and the detected equivalences. The method can also include creating a graph with the blocks as nodes and with edges determined from control flow. The method can further include identifying equivalent subgraphs in the graph, wherein the equivalent blocks are used to identify the equivalent subgraphs, starting with a pair of equivalent blocks as head nodes. The method also can include determining whether the equivalent subgraphs are functions that have been inlined or are to be interpreted as an inlined function. The method can include constructing a list of equivalent program sections utilizing the list of equivalent blocks. The plurality of features calculated for each block can include a feature derived from a mapping of each instruction in the block to an instruction type and chaining the instruction types as they appear in the block. The plurality of features calculated for each block can further include a feature derived from a mapping of each instruction in the block to an instruction type, combining the instruction types that appear in the block such that the combination result is order agnostic. The plurality of features calculated for each block can also include a feature derived from the frequency of the different instruction types in the block, allowing for partial/fuzzy matching of two blocks. The plurality of features calculated for each block can further include a feature derived from symbolic execution of the block. The plurality of features calculated for each block can also include a feature derived from translating the block into another intermediate representation, and passing it through an optimizer. The method can further include transforming a program into an alternate program based on the detected equivalent program sections. The method can include loading a program based on the graph and equivalent subgraphs into a user interface and visualizing the code and equivalent subgraphs. The method can also include accepting a user input to alter one or more decisions around subgraph equivalence and visualizing an updated code and updated equivalent subgraphs.

One embodiment of the claimed subject matter related to one or more computer-readable storage media that match program sections. The one or more computer-readable storage media have a plurality of instructions that, when executed by a processor, cause the processor to transform a program to an intermediate language representation and organize the intermediate language representation into blocks based on control flow. The instructions also cause the processor to calculate a plurality of features for each block. The instructions further cause the processor to compare the calculated features for each block in the program and create a list of equivalent blocks. The instructions can also cause the processor to receive a manual adjustment to the set of features that is to be used for equivalence checks and the detected equivalences. The instructions can also cause the processor to create a graph with the blocks as nodes and with edges determined from control flow. The instructions can also further cause the processor to identify equivalent subgraphs in the graph, wherein the equivalent blocks are used to identify the equivalent subgraphs, starting with a pair of equivalent blocks as head nodes. The instructions can also cause the processor to determine whether the equivalent subgraphs are functions that have been inlined or are to be interpreted as an inlined function. The instructions can also further cause the processor to construct a list of equivalent program sections utilizing the list of equivalent blocks. The instructions can further cause the processor to calculate a feature derived from a mapping of each instruction in the block to an instruction type and chaining the instruction types as they appear in the block. The instructions can also cause the processor to calculate a feature derived from a mapping of each instruction in the block to an instruction type, combining the instruction types that appear in the block such that the combination result is order agnostic. The instructions can further cause the processor to calculate a feature derived from the frequency of the different instruction types in the block, allowing for partial/fuzzy matching of two blocks. The instructions can also cause the processor to calculate a feature derived from symbolic execution of the block. The instructions can also cause the processor to calculate a feature derived from translating the block into another intermediate representation, and passing it through an optimizer. The instructions can also cause the processor to transform a program into an alternate program based on the detected equivalent program sections. The instructions can also further cause the processor to load a program based on the graph and equivalent subgraphs into a user interface and visualize the code and equivalent subgraphs. The instructions can also cause the processor to accept a user input to alter one or more decisions around subgraph equivalence and visualize an updated code and updated equivalent subgraphs.

Another embodiment of the claimed subject matter relates to a system for matching program sections includes a processor to execute processor executable code and a storage device that stores processor executable code. The processor executable code, when executed by the processor, causes the processor to organize a program into blocks based on control flow. The code further causes the processor to calculate a plurality of features for each block. The code also causes the processor to compare the calculated features for each block with other blocks and create a list of equivalent blocks. The code can also cause the processor to transform a program to an intermediate language representation and organize the intermediate language representation into blocks based on control flow. The code can also cause the processor to receive a manual adjustment to the set of features that is to be used for equivalence checks and the detected equivalences. The code can also cause the processor to create a graph with the blocks as nodes and edges determined from control flow. The code can further cause the processor to identify equivalent subgraphs in the graph, wherein the equivalent blocks are used to identify the equivalent subgraphs, starting with a pair of equivalent blocks as head nodes. The code can also cause the processor to determine whether the equivalent subgraphs are functions that have been inlined or are to be interpreted as an inlined function. The code can also further cause the processor to construct a list of equivalent program sections utilizing the list of equivalent blocks. The code can also cause the processor to calculate a feature derived from a mapping of each instruction in the block to an instruction type and chaining the instruction types as they appear in the block. The code can also cause the processor to calculate a feature derived from a mapping of each instruction in the block to an instruction type, combining the instruction types that appear in the block such that the combination result is order agnostic. The code can further cause the processor to calculate a feature derived from the frequency of the different instruction types in the block, allowing for partial/fuzzy matching of two blocks. The code can also cause the processor to calculate a feature derived from symbolic execution of the block. The code can further cause the processor to calculate a feature derived from translating the block into another intermediate representation, and passing it through an optimizer. The code can also cause the processor to transform a program into an alternate program based on the detected equivalent program sections. The code can also further cause the processor to load a program based on the graph and equivalent subgraphs into a user interface and visualize the code and equivalent subgraphs. The code can cause the processor to accept a user input to alter one or more decisions around subgraph equivalence and visualize an updated code and updated equivalent subgraphs.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
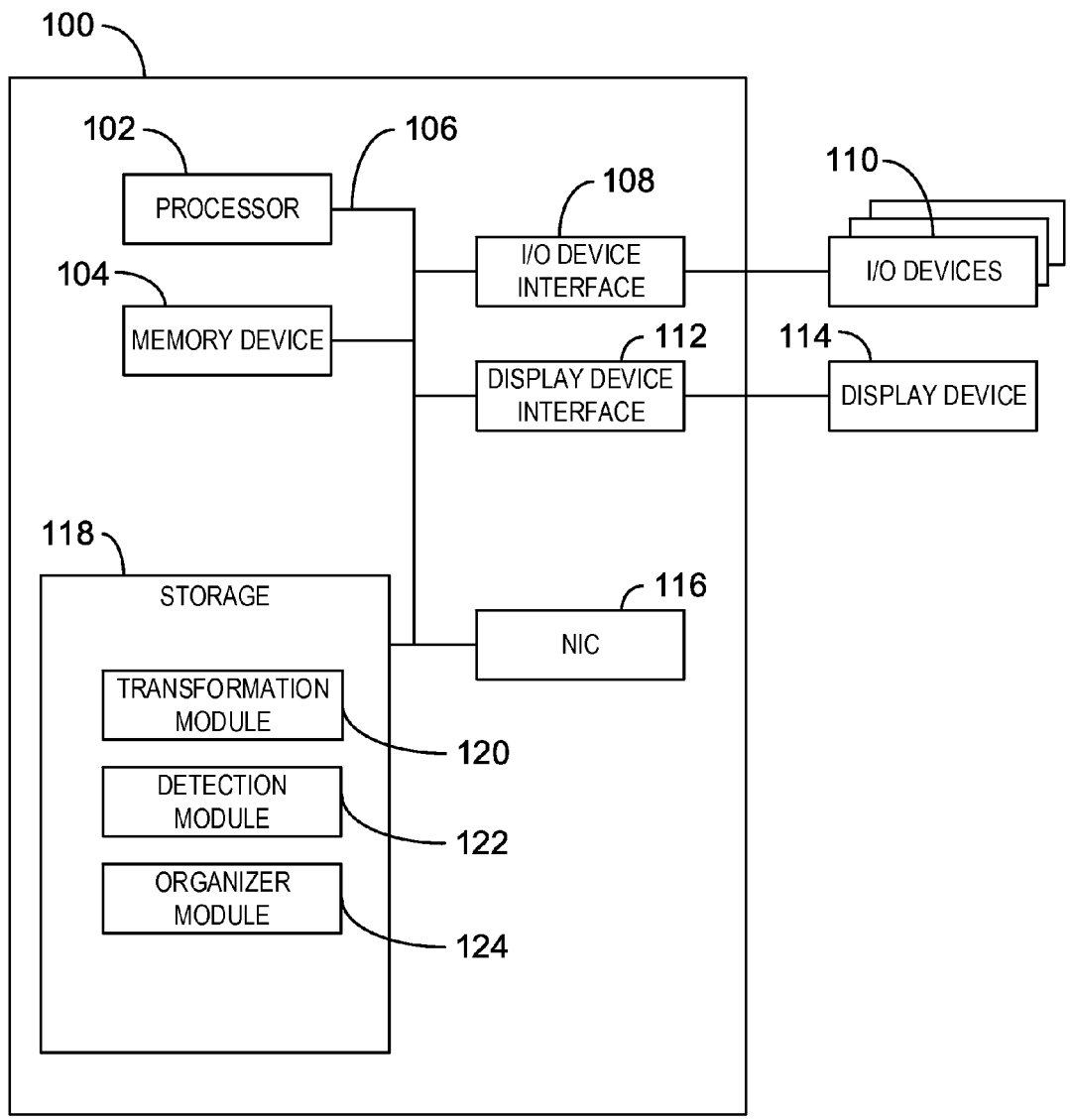
FIG. 1 is a block diagram of an example of a computing system that matches program sections.

As a preliminary matter, some of the Figures describe concepts in the context of one or more structural components, variously referred to as functionality, modules, features, elements, or the like. The various components shown in the Figures can be implemented in any manner, such as software, hardware, firmware, or combinations thereof. In some embodiments, various components reflect the use of corresponding components in an actual implementation. In other embodiments, any single component illustrated in the Figures may be implemented by a number of actual components. The depiction of any two or more separate components in the Figures may reflect different functions performed by a single actual component. FIG. 1, discussed below, provides details regarding one system that may be used to implement the functions shown in the Figures.

Other Figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

According to embodiments described herein, a program is organized into blocks. A program can be organized into instruction sequences. As used herein, an instruction sequence includes but is not limited to a sequence of processor specific instructions, assembly instructions or intermediate language instructions. In some embodiments, the control flow is used to break instruction sequences into blocks. A block, as used herein, is an instruction sequence ending with an instruction that can modify the flow of execution. In some embodiments, the blocks are represented as nodes on a set of graphs with edges determined from the control flow.

FIG. 1 is a block diagram of an example of a computing system that matches program sections. The computing system 100 may be, for example, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read-only memory, flash memory, or any other suitable memory systems. The instructions that are executed by the processor 102 may be used to match program sections. In some embodiments, the instructions may be used to identify equivalent blocks within a program. For example, the instructions may be used to detect inlined functions in the binary code representing a program.

The processor 102 may be connected through a system bus 106 (e.g., PCI®, PCI-Express®, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include a transformation module 120, a detection module 122, and an organizer module 124. In some embodiments, the transformation module 120 can transform a program to an intermediate language representation. For example, assembly code can be produced based on provided binary code. For example, the binary code may be x86, x64 or ARM® binaries. As discussed above, the transformed program typically lacks comments and may be voluminous.

In embodiments, the transformation module 120 organizes the program into blocks based on control flow.

In embodiments, the detection module 122 calculates a plurality of features for each block. The features can be derived from a variety of characteristics of each block. In some examples, the features can include tracking exact sequences of code operations. In some embodiments, the detection module 122 can derive a feature from a mapping of each instruction in the block to an instruction type and chaining the instruction types as they appear in the block. By chaining the instruction types as they appear in the block, the detection module 122 can preserve the order of the instructions in the block. In some embodiments, the detection module can derive a feature from a mapping of each instruction in the block to an instruction type, combining the instruction types that appear in the block such that the combination result is order agnostic. In some embodiments, the detection module 122 can derive a feature from the frequency of the different instruction types in the block, allowing for partial/fuzzy matching of two blocks. In some embodiments, the detection module 122 can derive a feature from symbolic execution of the block. For example, an initial set of symbolic values for processor registers and an initial memory state can be used as an initial system state before running a symbolic execution engine on the block. In some embodiments, the detection module 122 can derive a feature by translating the block into another intermediate representation, and passing it through an optimizer.

In some embodiments, the detection module 122 can compare features for each block in the program and create a list of equivalent blocks. In some examples, the equivalent blocks can be blocks that have one or more matching features.

In some embodiments, the organizer module 124 may create a graph with the blocks as nodes and with edges determined from code flow. A graph, node, and edge, as used herein, refer to the mathematical definition of graph, node and edge.

In some embodiments, the detection module 122 can identify equivalent subgraphs in the graph. In some examples, equivalent blocks can be used to identify equivalent subgraphs. In some examples, detection of equivalent subgraphs can start with a comparison of a pair of equivalent blocks as head nodes. A subgraph, as used herein, refers to the mathematical definition of a subgraph.

In some embodiments, the organizer module 124 can receive a manual adjustment to the set of features that should be used for equivalence checks and the detected equivalences. In some examples, a user may have indicated that two or more blocks should be treated as equivalent. For example, the organizer module 124 may receive a manual adjustment that two subgraphs should be considered equivalent.

In some embodiments, the detection module 122 can determine whether the equivalent subgraphs are functions that have been inlined or are to be otherwise be interpreted as inlined functions. In some embodiments, two matched subgraphs can then be inspected to see if they are well-formed functions. A well-formed function, as used herein, includes a function that has one entry point and, one or more exit points, and no jumps from outside the function to the middle of the function.

In some embodiments, the detection module 122 can then construct a list of equivalent program sections utilizing the list of equivalent blocks. For example, program sections can be matched if all their constituting blocks are equivalent.

In some embodiments, the organizer module 124 can transform the program into an alternate program based on the detected equivalent program sections. An alternate program, as used herein, can include, but is not limited to, rewriting the binary to remove occurrences of equivalent program sections. In some examples, the organizer module 124 can rewrite the program to replace each occurrence of a detected inlined function with a call to a new function created from the instructions that comprised the inlined function.

In some embodiments, the organizer module 124 can load the program based on the graph and equivalent subgraphs into a user interface (UI) and visualize the code and equivalent subgraphs. When the detection module 122 runs and detects similar sub-graphs as discussed above, the results are passed to the organizer module 124 for visualization, etc. The results can represent inlined functions or repeated program sections. In some examples, the organizer module 124 can allow the user to visually cycle and navigate between similar subgraphs. For example, various mechanisms to hide or display code, or hide or display similar subgraphs can be available for the user.

In some embodiments, the organizer module 124 can accept user input to alter one or more decisions around subgraph equivalence. The result of user's manual decision is subsequently used to improve the analysis as described below, used in binary rewriting as described above, or in creating a visualization and/or UI. In some embodiments, the organizer module 124 can visualize the updated code and updated equivalent subgraphs.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the transformation module 120, the detection module 122, and the organizer module 124 can be partially, or entirely, implemented in hardware and/or in the processor 102. For example, the functionality can be implemented with an application specific integrated circuit, in logic implemented in the processor 102, or in any other device. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs), etc.

Figure 2:
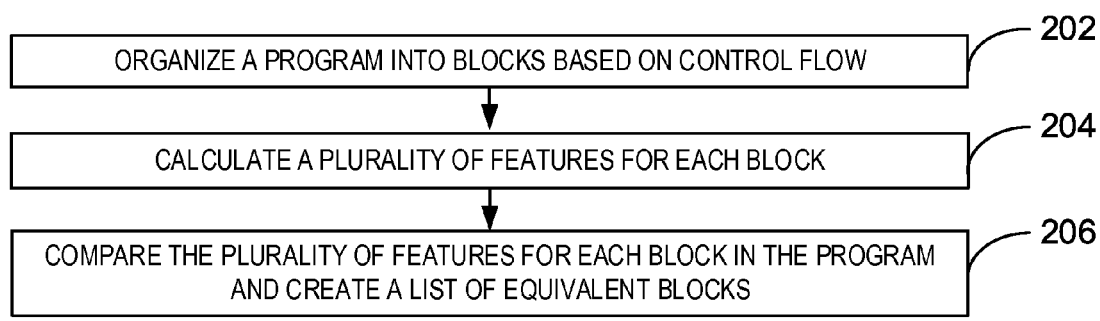
FIG. 2 is a high-level process flow diagram of an example method for matching program sections.

FIG. 2 is a high-level process flow diagram of an example method for matching program sections. The method 200 can be implemented with any suitable computing device, such as the computing system 100 of FIG. 1.

At block 202, the transformation module 120 organizes a program into blocks based on control flow. In some examples, a block can include any suitable number of instructions or lines of assembly code which follow a transfer of flow of execution. For example, a block can start after a jump instruction which changes the flow of execution by modifying an instruction pointer value. In some embodiments, the transformation module 120 can transform a program to an intermediate language representation and organize the intermediate language representation into blocks based on control flow as discussed in greater length in FIG. 3 below.

At block 204, the detection module 122 calculates a plurality of features for each block. For example, the features can be derived from a variety of characteristics of the blocks as described in greater detail in FIG. 3 below.

At block 206, the detection module 122 compares the plurality of features for each block in the program and create a list of equivalent blocks. For example, the equivalent blocks can be blocks that have one or more matching features.

The process flow diagram of FIG. 2 is not intended to indicate that the operations of the method 200 are to be executed in any particular order, or that all of the operations of the method 200 are to be included in every case. Further, any number of additional operations can be included within the method 200, depending on the specific application.

Figure 3:
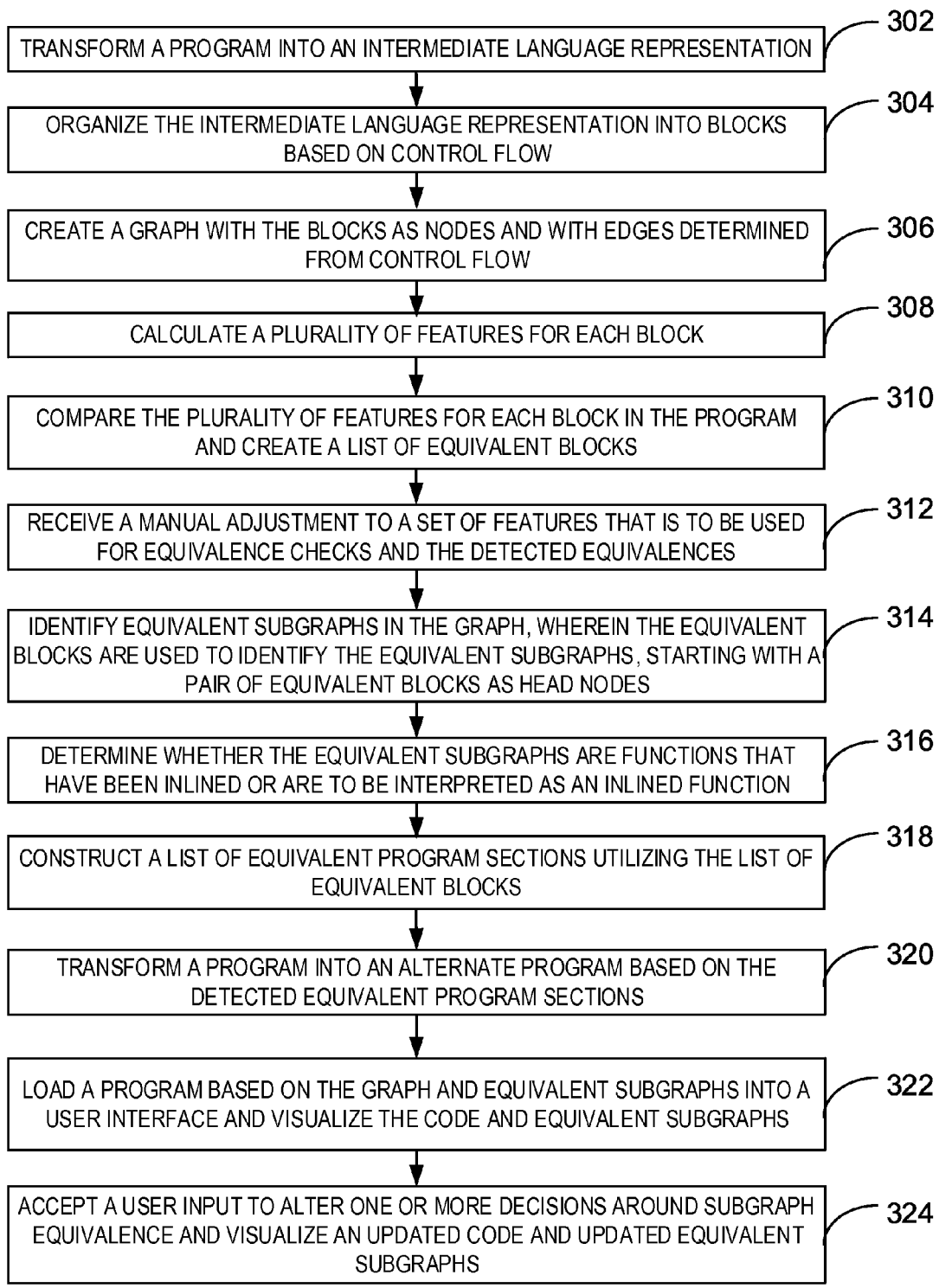
FIG. 3 is a detailed process flow diagram of an example method for matching program sections.

FIG. 3 is a detailed process flow diagram of an example method for matching program sections. The method 300 can be implemented with any suitable computing device, such as the computing system 100 of FIG. 1.

At block 302, the transformation module 120 transforms a program into an intermediate language representation. In some examples, the intermediate language may be a form of assembly language. For example, binary code can be translated into assembly code. In some examples, a high level language (such as C++) source code can be translated into an intermediate language with a compiler.

At block 304, the transformation module 120 organizes the intermediate language representation into blocks based on control flow. For example, an assembly language representation may be divided into blocks based upon the control flow of the code.

At block 306, the organizer module 124 can create a graph with the blocks as nodes and with edges determined from control flow.

At block 308, the detection module 122 calculates a plurality of features for each block. The features can be derived from a variety of characteristics of the blocks. For example, a feature can be derived from a mapping of each instruction in the block to an instruction type, then chaining the instruction types and thus preserving their order. A number can be assigned to each instruction type. For example, a MOV EAX, EBX is a move between registers and has the same type as a MOV ECX, EDX instruction. In some examples, the detection module 122 can concatenate the instruction type of each instruction in the block and then calculate a digest on the result. In some examples, the detection module 122 can take operand types into account for the mapping of instructions to the instruction types. In some examples, operand types are not taken into account, resulting in a looser matching feature. For example, a register addressing mode instruction can be matched with an indirect addressing mode instruction if the operand type is not taken into account.

In some embodiments, the features can include a feature derived from a mapping of each instruction in the block to an instruction type and combining the instruction types that appear in the block such that the combination result is order agnostic. For example, detection module 122 can associate a unique prime number with each instruction type. The result of the mapping for each instruction in the block is multiplied to produce a number from which a digest can be calculated. The use of unique prime numbers for each instruction type results in a unique number for each composition of instruction types.

In some embodiments, the detection module 122 can derive a feature from the frequency of different instruction types present in the blocks. For example, the detection module 122 can count the number of times that each instruction type occurs in a block. This feature can allow for a partial or "fuzzy" matching of two blocks.

Still referring to block 308, in some embodiments, the detection module 122 can derive a feature from the symbolic execution of the blocks. For example, the detection module 122 can use an initial set of symbolic values for processor registers and an initial memory state as an initial system state before running a symbolic execution engine on the block. The detection module 122 can use the resulting system state post symbolic execution of the block to calculate a digest that the detection module 122 can then use to check equivalence of two blocks.

In some embodiments, the detection module 122 derives a feature from translating the block into another intermediate representation, and passing it through an optimizer. In some examples, the detection module 122 can translate blocks into an intermediate representation. This intermediate language code is passed through an optimizer. The optimization results in a normalized form for the block which can then be fed into any of the previous feature extraction methods.

At block 310, the detection module 122 compares the calculated features for each block in the program and creates a list of equivalent blocks. In some examples, the equivalent blocks can be blocks that have one or more matching features.

At block 312, the organizer module 124 can receive a manual adjustment to the set of features that is to be used for equivalence checks and the detected equivalences. In some examples, a user can have indicated that two or more equivalent subgraphs should be considered equivalent. The detection module 122, can then use this information for matching program sections.

At block 314, the detection module 122 can identify equivalent subgraphs in the graph. In some examples, the detection module 122 can use equivalent blocks to identify equivalent subgraphs. In some examples, the detection module 122 can start the equivalence comparison with a pair of equivalent blocks as head nodes. For example, breadth-first graph traversal can be used to match two subgraphs. The breadth-first graph traversal can start from an initial equivalent block as a head node of each subgraph. The child nodes of the head nodes can then be compared. In some examples, if the detection module 122 does not find a match at a certain level, then it can use a looser feature to ensure a longer path is not missed due to compiler optimizations. For example, a compiler can have used reordering or equivalence to slightly change instances of the same inlined function as they are compiled. A feature that is loose can be used to disregard these slight changes to the code in matching two subgraphs as discussed below.

At block 316, the detection module 122 can determine whether the equivalent subgraphs are functions that have been inlined or are to be interpreted as inlined functions. In some embodiments, the detection module 122 can then inspect two matched subgraphs to see if they are well-formed functions. In some examples, the subgraphs may not be well-formed functions and detection module 122 can therefore match them as equivalent program sections. In some examples, the detection module 122 can detect the matched subgraphs as representing well-formed functions that have been inlined. In some examples, the detection module 122 can detect functions within functions. For example, a large function can be composed of many smaller functions. In some examples, the matching can be done at the level of the smaller functions. In some other examples, the matching can be done at the level of the large function.

At block 318, the detection module 122 constructs a list of equivalent program sections utilizing the list of equivalent blocks. In some examples, the equivalent programs sections may be inlined functions.

At block 320, the organizer module 124 can transform the program into an alternate program based on the detected equivalent program sections. In some examples, the organizer module 124 can rewrite the detected inlined functions in the program in the form of one function with function calls replacing every other instance of the inlined function. In some examples, the organizer module 124 can rewrite the binary code. The binary code can then be disassembled into a program that has a much clearer view due to the elimination of most of the inlining. For example, in case of a binary input, where some function calls have been inlined, each instance of an inlined function is detected by the method described. The organizer module 124 can then replace each instance of an inlined function in the binary input with a call to a new function created from the blocks that comprised the inlined function instance. The organizer module 124 can then also produce a new binary in which the inlined functions have been replaced with calls. As a result, analysis, reverse-engineering or decompilation of this binary which is equivalent in functionality to the original may be easier.

At block 322, the organizer module 124 can load the program based on the graph and equivalent subgraphs into a user interface (UI) and visualize the code and equivalent subgraphs. When the detection module 122 detects similar subgraphs as discussed above, the detection module 122 can store the results in a file for later consumption by a visual tool. The results can represent inlined functions or a set of related nodes that stem from repeated code in the original program. In some examples, the organizer module 124 can display the results with various visualization capabilities. For example, the organizer module 124 can present the option of naming all the equivalent sub-graphs. In some examples, the organizer module 124 can initially assign default dummy names to the found sub-graphs. In some examples, the organizer module 124 can present an option of assigning distinguished colors for all identified sub-graph attributes. The organizer module 124 can then color all related sub-graphs (with the same attributes) with a shade of the same color. For example, the detection module 122 can identify the following three different sub-graphs: {Subgraph1A, Subgraph1B} (i.e. two instances of Subgraph 1), {Subgraph2A}, {Subgraph3A, Subgraph3B, Subgraph3C}. The organizer module 124 can assign each subgraph a unique color as follows: Subgraph1→RED, Subgraph2→GREEN, Subgraph3→BLUE. For each block set in each sub-graph, the organizer module 124 can assign a different shade of the assigned color as follows: SubGraph1→RED→Subgraph1A: Red/shade1, Subgraph1B: Red/shade2, SubGraph2→GREEN→Green/shade1, SubGraph3→BLUE→Subgraph3A: Blue/shade1, Subgraph3B: Blue/shade2, Subgraph3C: Blue/shade3. Thus, related subgraphs can share a similar color while still being distinguishable by their different shades.

In some examples, the organizer module 124 can present an option to visually cycle and navigate between similar subgraphs. For example, the organizer module 124 can provide various mechanisms to hide or display code, or hide or display similar subgraphs. In some examples, the organizer module 124 can present an option to collapse a matched subgraph to a single node. For example, when an inlined function instance is collapsed this way, the user can just see the name of the inlined function on one node instead of the whole subgraph comprising the inlined function.

At block 324, the organizer module 124 can accept user input to alter one or more decisions around subgraph equivalence. For example, a user input may be that two or more subgraphs are to be treated as equivalent subgraphs or are not to be treated as equivalent subgraphs. In some embodiments, the organizer module 124 can also visualize an updated code and updated equivalent subgraphs. In some examples, a user may decide that one or more equivalent subgraphs are not inlined functions and can indicate this through the user interface. The organizer module 124 can then visualize the updated code and equivalent subgraphs.

The process flow diagram of FIG. 3 is not intended to indicate that the operations of the method 300 are to be executed in any particular order, or that all of the operations of the method 300 are to be included in every case. For example block 320, may follow block 318, and block 324 may follow any of blocks 316-322. Further, any number of additional operations can be included within the method 300, depending on the specific application.

Figure 4A:
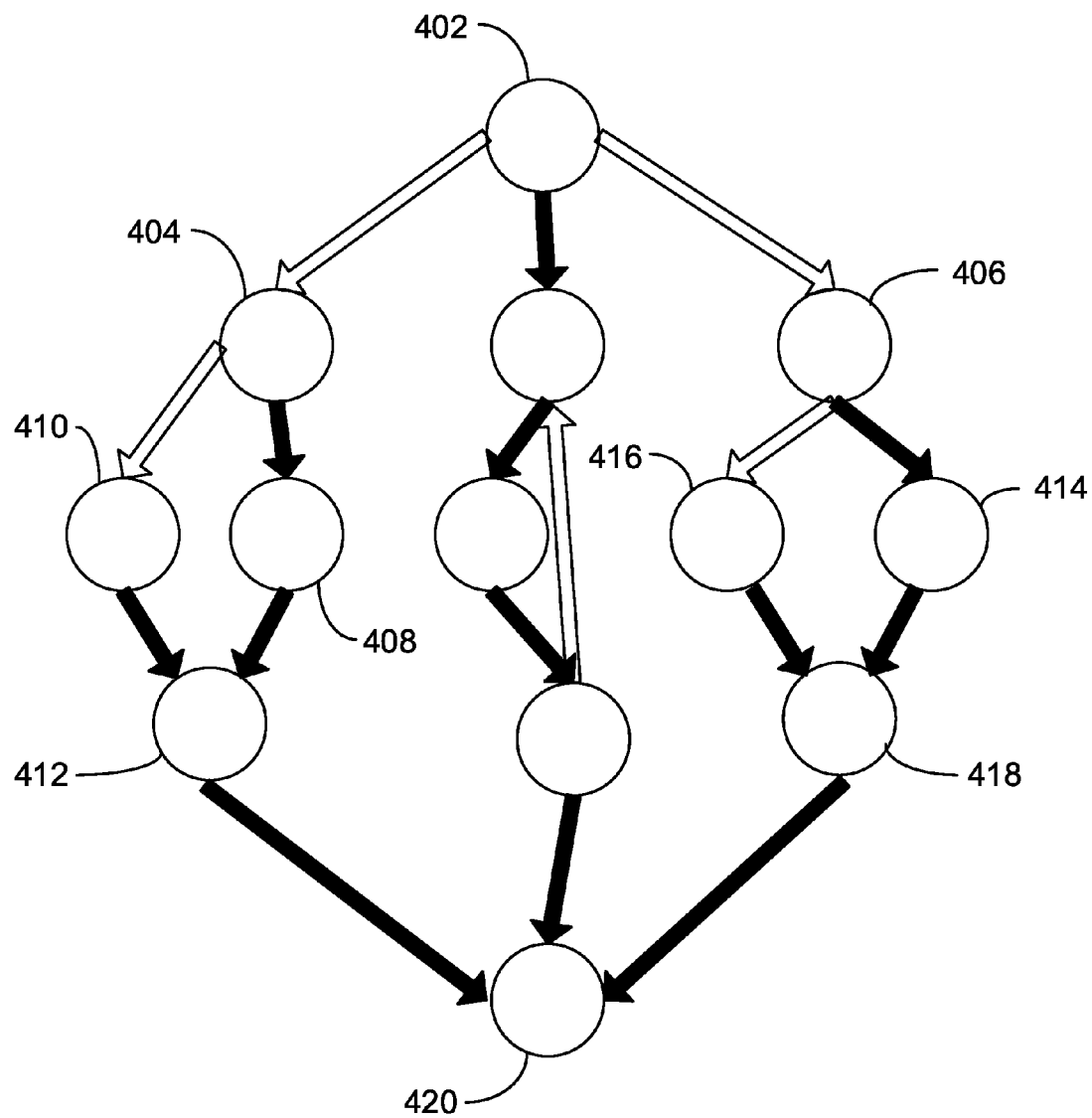
FIG. 4A is an example graph for displaying equivalent blocks.

FIG. 4A is an example graph for displaying equivalent blocks. The example graph of FIG. 4A is generally be referred to by the reference number 400A. Head node 402 is connected by edges represented as arrows to child nodes 404 and 406. A subgraph within the graph 400A can include nodes 404, 408, 410, and 412. Another subgraph can include nodes 406, 414, 416, and 418.

In FIG. 4A, the flow of execution of blocks in a given program is displayed as a series of nodes depicted by circles that are graphic representations of the blocks. Head nodes 402 is connected to child nodes, 404, 406 by edges represented by arrows. The arrows of FIG. 4A indicate the possible flow of execution. In some embodiments, the equivalent subgraphs can be collapsed at their head nodes. For example, the child nodes for detected instances of an equivalent subgraph can be hidden as in the example of FIG. 4B.

Figure 4B:
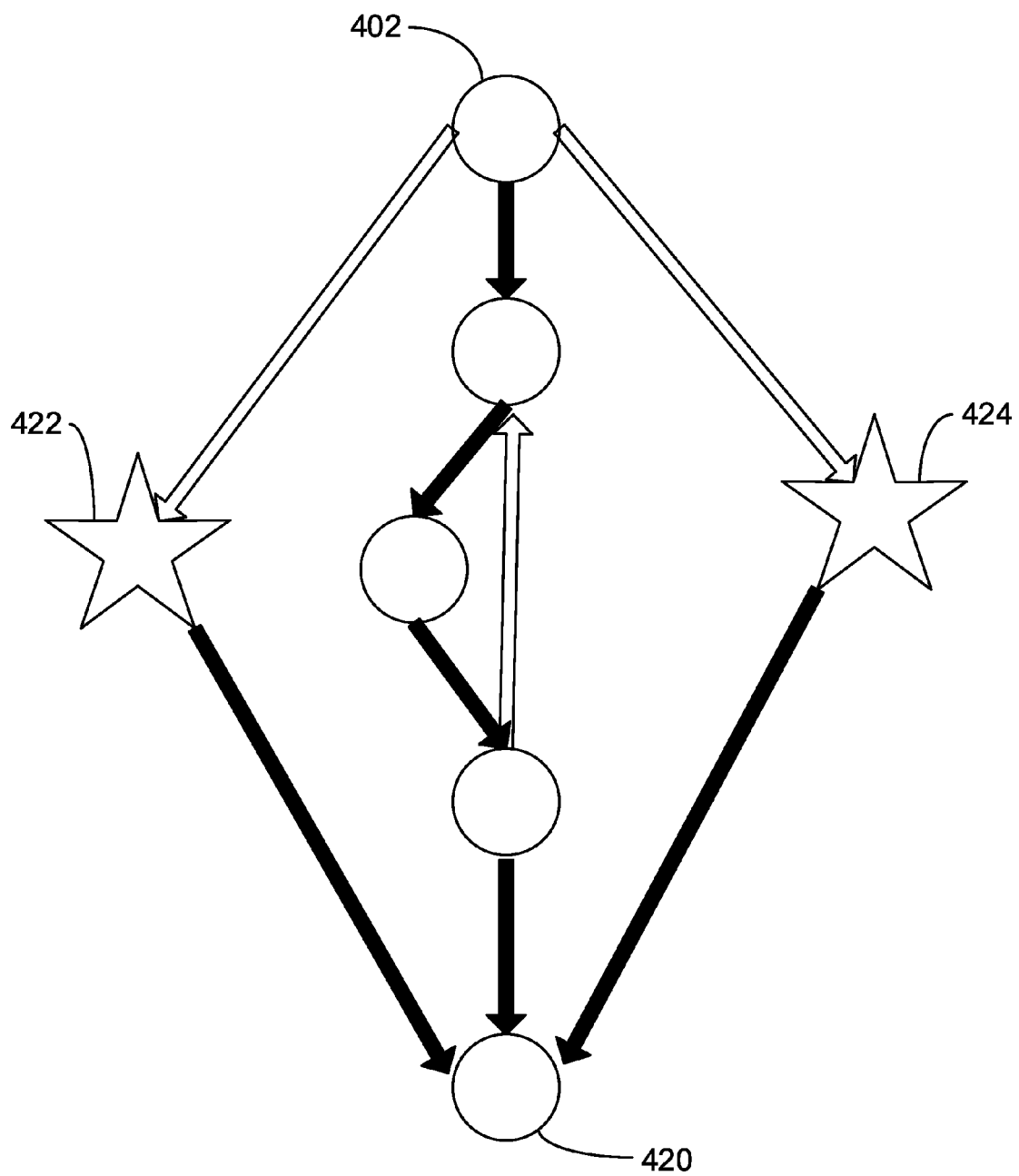
FIG. 4B is an example graph for displaying equivalent subgraphs.

FIG. 4B is an example graph for displaying equivalent subgraphs. The example graph of FIG. 4B is generally referred to by reference number 400B.

In FIG. 4B, nodes 422 and 424 represent the collapsed forms of equivalent subgraphs 1404, 410, 408, 4121, and 1406, 416, 414, 4181 in FIG. 4A, respectively. In some examples, a collapsed node can indicate a particular subgraph has been detected to be an instance of an inlined function. The subgraph can be replaced by a symbol that is shared by other detected instances of the same inlined function. In some examples, a collapsed node can be expanded to reveal the subgraph that the collapsed node represents. In some examples, collapsed nodes that are similar can be given a similar symbol. In the example of 400B, the symbol used to replace the subgraphs of nodes 404, 408, 410, and 412 is a star 422. Another star 424 replaces the subgraph originally composed of nodes 406, 414, 416 and 418. In some examples, different colors can be used place of symbols. In some embodiments, by selecting the collapsed node, the subgraph that has been collapsed can reappear in its original full form. For example, the star of 422 may be selected and the original subgraph with head node 404 of 400A can appear. By hiding the subgraphs of inlined functions, a user may analyze a complex graph more easily.

Figure 5:
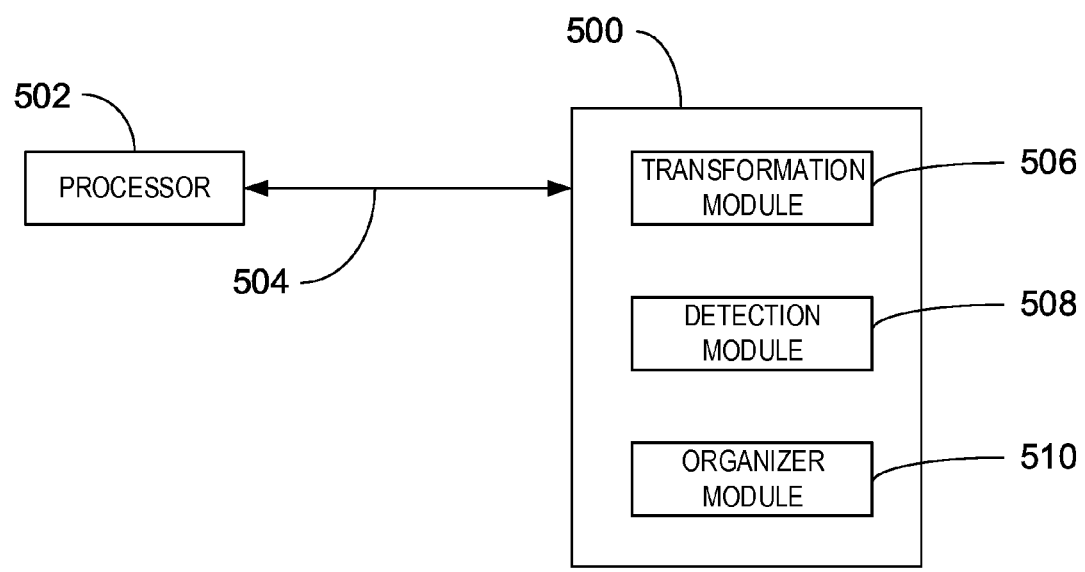
FIG. 5 is a block diagram showing a tangible, computer-readable storage media that can be used to match program sections.

FIG. 5 is a block diagram showing a tangible, computer-readable storage medium that can be used to match program sections. The tangible, computer-readable storage media 500 may be accessed by a processor 502 over a computer bus 504. Furthermore, the tangible, computer-readable storage media 500 may include code to direct the processor 502 to perform the current method.

The various software components discussed herein may be stored on the tangible, computer-readable storage media 500, as indicated in FIG. 5. For example, the tangible computer-readable storage media 500 can include a transformation module 506, a detection module 508, and an organizer module 510. In some embodiments, the transformation module 506 organizes a program into blocks based on control flow. In some examples, the transformation module 506 can transform a program to an intermediate language representation. In some examples, the transformation module 506 can organize the intermediate language representation into blocks based on control flow. The detection module 508 can further calculate a plurality of features for each block. In some embodiments, the detection module 508 can compare the calculated features for each block in the program with other blocks in the program and create a list of equivalent blocks. The organizer module 510 can also transform a program to an intermediate language representation and organize the intermediate language representation into blocks based on control flow. The organizer module 510 can further receive a manual adjustment to a set of features that is to be used for equivalence checks and the detected equivalences. The organizer module 510 can also create a graph with the blocks as nodes and with edges determined from control flow. The detection module 508 can identify equivalent subgraphs starting with a pair of equivalent blocks as head nodes. The detection module 508 can use equivalent blocks to identify the equivalent subgraphs. In some embodiments, the detection module 508 can determine whether the equivalent subgraphs are functions that have been inlined or are to be interpreted as an inlined function. In some embodiments, the detection module 508 can construct a list of equivalent program sections utilizing the list of equivalent blocks. In some embodiments, the organizer module 510 can transform the program into an alternate program based on the detected equivalent program sections. In some embodiments, the organizer module 510 can also load the program based on the graph and equivalent subgraphs into a user interface and visualize the code and equivalent subgraphs. In some embodiments, the organizer module 510 can also accept a user input to alter one or more decisions around subgraph equivalence and visualize an updated code and updated equivalent subgraphs. In some examples, the user input can include any form of user gestures or use of an input device.

It is to be understood that any number of additional software components not shown in FIG. 5 can be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

The invention claimed is:

1. A method for matching program sections, comprising:
   organizing, via a processor, a program into blocks based on control flow;
   calculating, via the processor, a plurality of block features for each block;
   comparing, via the processor, the plurality of block features for each block with other blocks and creating a list of equivalent blocks, the equivalent blocks representing an inlined function; and
   transforming, via the processor, the equivalent blocks representing the inlined function into an alternate program by replacing each of the equivalent blocks with a call to a new function created from the equivalent blocks.

2. The method of claim 1, wherein organizing the program into blocks based on control flow comprises transforming a program to an intermediate language representation and organizing the intermediate language representation into blocks based on control flow.

3. The method of claim 1, further comprising receiving a manual adjustment to a set of features that is to be used for equivalence checks and the detected equivalences.

4. The method of claim 1, further comprising creating a graph with the blocks as nodes and with edges determined from control flow.

5. The method of claim 4, further comprising identifying equivalent subgraphs in the graph, wherein the equivalent blocks are used to identify the equivalent subgraphs, starting with a pair of equivalent blocks as head nodes.

6. The method of claim 5, further comprising determining whether the equivalent subgraphs are functions that have been inlined or are to be interpreted as an inlined function.

7. The method of claim 2, wherein the plurality of block features for each block comprises two or more of:
- a feature derived from a mapping of each instruction in the block to an instruction type and chaining the instruction types as they appear in the block;
- a feature derived from a mapping of each instruction in the block to an instruction type, combining the instruction types that appear in the block such that the combination result is order agnostic;
- a feature derived from the frequency of the different instruction types in the block, allowing for partial or fuzzy matching of two blocks;
- a feature derived from symbolic execution of the block; and
- a feature derived from translating the block into another intermediate representation, and passing it through an optimizer.

8. The method of claim 5, further comprising loading a program based on the graph and equivalent subgraphs into a user interface and visualizing the code of the program and equivalent subgraphs.

9. The method of claim 8, further comprising accepting a user input to alter one or more decisions around subgraph equivalence and visualizing an updated code and updated equivalent subgraphs.

10. One or more computer-readable hardware storage media that match program sections, comprising a plurality of instructions that, when executed by a hardware processor, cause the processor to:
- transform a program to an intermediate language representation;
- organize the intermediate language representation into blocks based on control flow;
- calculate a plurality of block features for each block;
- compare the plurality of block features for each block with other blocks and create a list of equivalent blocks, the equivalent blocks representing an inlined function; and
- transform the equivalent blocks representing the inlined function into an alternate program by replacing each of the equivalent blocks with a call to a new function created from the equivalent blocks.

11. The one or more computer-readable storage media of claim 10, further comprising a plurality of instructions that, when executed by a processor, cause the processor to receive a manual adjustment to a set of features that is to be used for equivalence checks and the detected equivalences.

12. The one or more computer-readable storage media of claim 10, further comprising a plurality of instructions that, when executed by a processor, cause the processor to create a graph with the blocks as nodes and with edges determined from control flow.

13. The one or more computer-readable storage media of claim 12, further comprising a plurality of instructions that, when executed by a processor, cause the processor to identify equivalent subgraphs in the graph, wherein the equivalent blocks are used to identify the equivalent subgraphs, starting with a pair of equivalent blocks as head nodes.

14. The one or more computer-readable storage media of claim 13, further comprising a plurality of instructions that, when executed by a processor, cause the processor to determine whether the equivalent subgraphs are functions that have been inlined or are to be interpreted as an inlined function.

15. The one or more computer-readable storage media of claim 10, wherein the plurality of block features for each instruction sequence comprises two or more of:
- a feature derived from a mapping of each instruction in the block to an instruction type and chaining the instruction types as they appear in the block;
- a feature derived from a mapping of each instruction in the block to an instruction type, combining the instruction types that appear in the block such that the combination result is order agnostic;
- a feature derived from the frequency of the different instruction types in the block, allowing for partial or fuzzy matching of two blocks;
- a feature derived from symbolic execution of the block; and
- a feature derived from translating the block into another intermediate representation, and passing it through an optimizer.

16. The one or more computer-readable storage media of claim 13, further comprising a plurality of instructions that, when executed by a processor, cause the processor to load the program based on the graph and equivalent subgraphs into a user interface and visualize code of the program and equivalent subgraphs.

17. The one or more computer-readable storage media of claim 16, further comprising a plurality of instructions that, when executed by a processor, cause the processor to accept a user input to alter one or more decisions around subgraph equivalence and visualize an updated code and updated equivalent subgraphs.

18. A system for matching program sections, comprising:
- a hardware processor to execute processor executable code; and
- a storage device that stores processor executable code, wherein the processor executable code, when executed by the processor, causes the processor to:
- organize a program into blocks based on control flow;
- calculate a plurality of block features for each block;
- compare the plurality of block features for each block with other blocks and create a list of equivalent blocks, the equivalent blocks representing an inlined function; and
- transform the equivalent blocks representing the inlined function into an alternate program by replacing each of the equivalent blocks with a call to a new function created from the equivalent blocks.

* * * * *